June 24, 1969  E. J. HAMMOND  3,451,686

CHUCK CONSTRUCTION

Filed Aug. 2, 1965

INVENTOR.
EARL J. HAMMOND
BY
Learman, Learman & McCulloch
ATTORNEYS

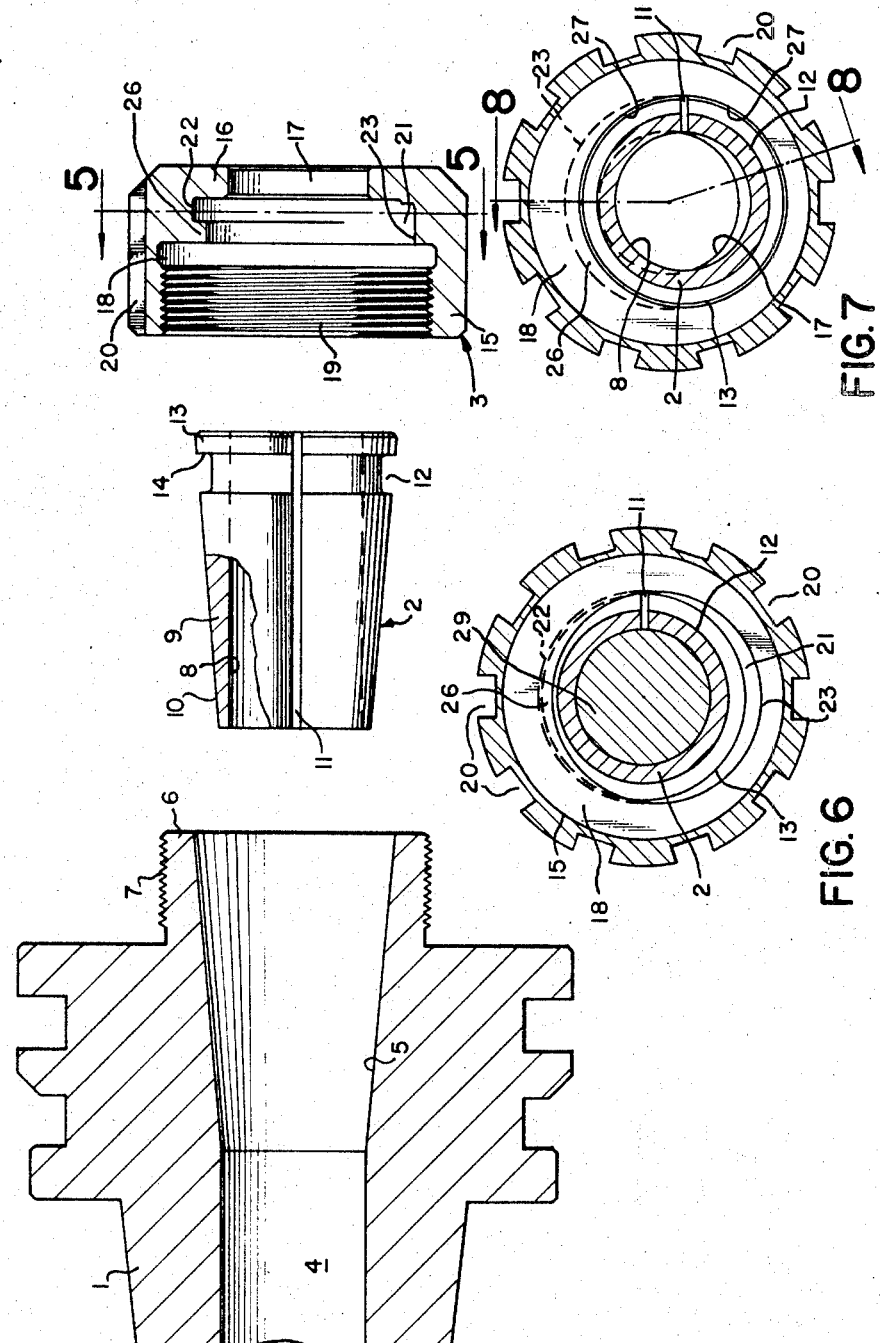

United States Patent Office 3,451,686
Patented June 24, 1969

3,451,686
CHUCK CONSTRUCTION
Earl J. Hammond, Frankenmuth, Mich., assignor, by mesne assignments, to Houdaille Industries, Inc., Buffalo, N.Y., a corporation of Michigan
Filed Aug. 2, 1965, Ser. No. 476,521
Int. Cl. B23b *31/12, 5/22, 5/34*
U.S. Cl. 279—51      5 Claims

ABSTRACT OF THE DISCLOSURE

A collet chuck having a tapered chuck body for reception of a correspondingly tapered, axially slit, radially compressible collet terminating at its outer end in a cylindrical locking flange provided by an annular groove adjacent the one end of the collet, and a clamping nut in threaded engagement with the body. The clamping nut has a forward wall provided with an axial opening for the reception of a tool shank and an inner recess having a radius greater than that of the locking flange. Extending radially into the recess is a holding flange formed on a radius greater than that of the locking flange and being axially eccentric with respect to the recess to enable the holding flange to be accommodated in the annular groove of the collet.

---

This invention relates to a chuck for the collet type in which a tool or work piece, having a cylindrical shank, is adapted to be removably secured.

Chucks of this type generally comprise a body having a bore which terminates at the forward end of the body in an outwardly flaring conical bore portion, and a collet having an axial cylindrical bore therein and an outer conical wall surface which cooperates with the outwardly flaring bore portion in the body. The collet, which is preferably fashioned of tempered steel and is slotted from end to end thereof, is adapted to have the shank of a tool or workpiece inserted into the axial bore thereof, and to be forced into the conical bore in the body by a clamping nut which is threaded onto or into a threaded section disposed at the forward end of the body about the outwardly flaring conical bore portion therein. As the collet is forced into the conical bore in the body it is contracted, due to the slot therein, into clamping engagement with the shank of the tool or workpiece disposed in the axial bore thereof. In order for the collet to firmly and securely grip the shank of the tool or workpiece the taper of the complementary conical bore and outer conical wall of the body and collet respectively should not exceed 10° in order to assure sufficient wedging of the collet into engagement with the tool or workpiece shank therein. But unless this taper is substantially greater than 10° the collet is not self-releasing and will remain in the body bore even though the endwise pressure thereon is released by the removal of the clamping nut. In previous chuck constructions of which I am aware the means provided for withdrawing the collet from the body bore as the nut is withdrawn have rendered disassembly of the collet and nut assembly quite difficult, and it has not been possible to readily change collets to provide for gripping shanks of different diameter.

It is a principal object of the present invention to provide a collet chuck with collet removing means by which the collet is automatically removed from the body bore along with the clamping nut, while still providing a nut and collet assembly which can be rapidly and easily disassembled with a minimum of effort and without the use of tools of any kind.

Another object of the invention is to provide a collet chuck wherein the collet may be initially disposed eccentrically with respect to the chuck body but is automatically brought into concentricity as the collet is clamped down.

Having stated the principal objects of the invention other and more limited objects thereof will be apparent from the following specification and the accompanying drawings forming a part thereof in which the presently preferred embodiment of the invention is disclosed.

In the drawings:

FIGURE 4 is an exploded sectional view of the chuck body, collet, and clamping nut;

FIGURE 6 is a transverse sectional view taken on the line 6—6 in FIGURE 1;

FIGURE 7 is a view similar to FIGURE 6 illustrating the manner in which the clamping nut is applied to the collet just prior to the insertion of the collet into the chuck body.

Figure 8:
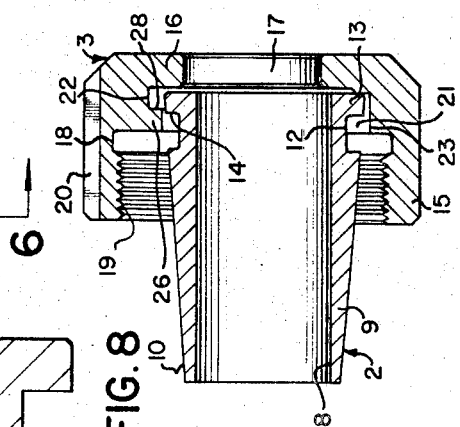
FIGURE 8 is a vertical sectional view taken on the line 8—8 of FIGURE 7.

The collet chuck of the present invention, as shown particularly in FIGURE 4 in the drawings, comprises a chuck body generally designated 1, a collet generally designated 2, and a clamping member or nut generally designated 3. The chuck body 1, which is adapted to be secured to the spindle of a machine tool, is provided with an axial bore 4 which terminates at its forward end in an outwardly flaring smooth surfaced conical bore portion 5. The body 1 is also provided with a cylindrical boss 6 which extends outwardly from the forward end of the body 1 and is externally threaded as indicated at 7.

The collet 2, which is preferably of tempered steel, is provided with a cylindrical axial bore 8, and the wall 9 of the collet has a smooth frusto-conical outer surface 10, which is complementary to the conical bore portion 5 in the body 1, and is axially slotted clear through from end to end thereof as shown at 11. The angle of the tapered conical surfaces 5 and 10 with respect to the axis of the chuck is preferably 10°, slightly more or less. The wall 9, adjacent the forward end thereof, has a concentric annular groove 12 formed therein thereby providing a cylindrical locking flange 13 about the forward end of the collet, and an annular shoulder 14 between the groove 12 and the flange 13.

Figure 5:
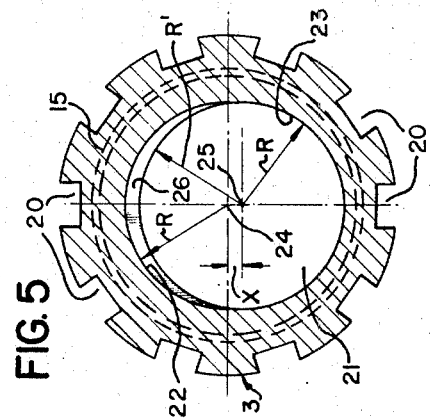
FIGURE 5 is a transverse sectional view through the clamping nut, the plane of the section being indicated by the line 5—5 in FIGURE 4.

The clamping nut 3 comprises an annular body section 15 having a front wall 16 which is provided with an axially disposed circular aperture 17, the diameter of which is slightly greater than the diameter of the bore 8 in the collet 2 but less than the diameter of the flange 13. The rear end of the body section 15 of the nut 3 is provided with an enlarged axial bore 18, which terminates substantially mid-way between the front and rear ends of the body section 15, and is internally threaded as indicated at 19. The threads 19, which are complementary to the external threads 7 on the boss 6, adapt the nut 3 for screwing onto and off the boss 6. The outer wall of the body section 15 has a plurality of annularly spaced notches 20 formed therein for the reception of a spanner wrench by which the nut 3 is adapted to be rotated when being applied to or removed from the boss 6. A cavity or recess 21 which is defined by a pair of spaced diametrically opposed connected semi-circular walls 22 and 23, is formed in the body section 15 between the inner end of the bore 18 and the inner face of the end wall 16. The center of curvature 24 of the semi-circular wall 22 is located in the axis of the nut 3, and the center of curvature 25 of the semi-circular wall 23 is off-set the distance $x$ from the axis of the nut 3 as shown in FIGURE 5. The semi-circular wall 22 is therefore concentric with the aperture 17 and the bore 18 in the nut 3 and the semi-circular wall 23 is eccentrically disposed with respect to the aperture 17 and bore 18. The semi-circular walls 22 and 23 both have the same radius R which is slightly greater than the radius of the cylindrical locking flange 13 about the forward end of the collet 2. The inner end of the semi-circular wall 22, adjacent the bore 18, is provided with a radially inwardly extending semi-circular holding flange 26, the center of curvature of which is coincident with the center of curvature 25 of the semi-circular wall 23, and the radius R' of which is the same as the radii of the semi-circular walls 22 and 23. The ends of the semi-circular flange 26 merge into the axially inner end of the semi-circular wall 23. The flange 26 together with the semi-circular wall 23 therefore defines a circular opening 27 into the cavity 21, the diameter of which is slightly greater than the diameter of the cylindrical flange 13 at the forward end of the collet 2. The width of the flange 26 is such that the width of the semi-circular wall 22 behind the flange 26 is slightly wider than the width of the collet flange 13.

Figure 1:
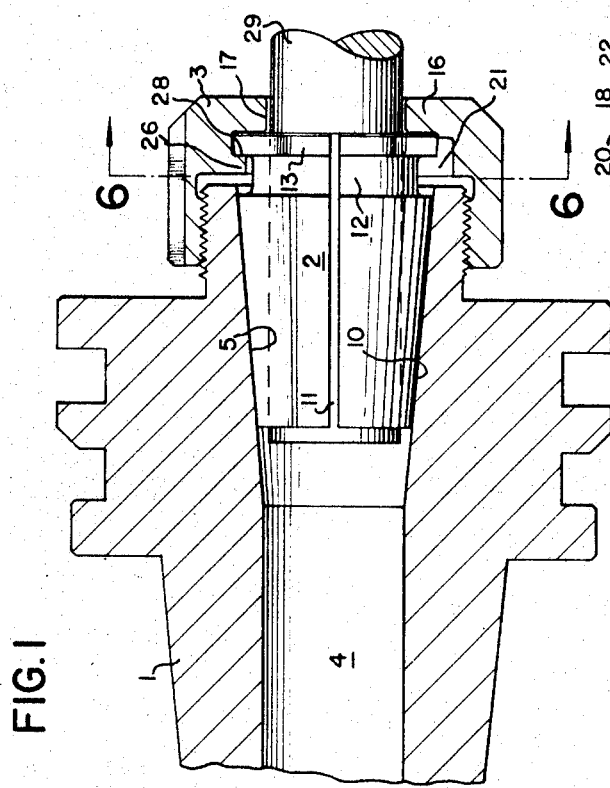
FIGURE 1 is a central longitudinal vertical sectional view of a collet chuck constructed according to my invention, showing a tool shank clamped therein.
Figure 3:
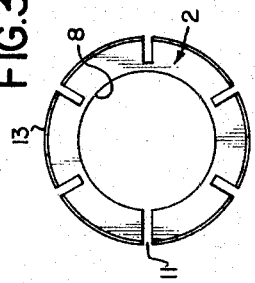
FIGURE 3 is a front elevational view of the collet.
Figure 2:
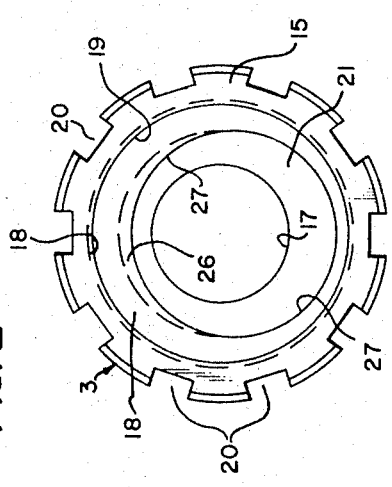
FIGURE 2 is a rear elevational view of the clamping nut which is employed to force the collet into the conical bore portion in the chuck body.

In use the outer end of the collet 2 is inserted through the opening 27 into the cavity 21 in the clamping nut 3 until the end of the collet engages the inner face of the end wall 16 of the nut 3, as shown in FIGURES 7 and 8, after which the collet 2 and nut 3 are shifted laterally with respect to each other into the position shown in FIGURES 6 and 1, in which position the semi-circular flange 26 of the clamping nut 3 projects downwardly into the groove 12 in the collet 2 with the inner face 28 of the semi-circular flange 26 engaging the shoulder 14 of the cylindrical flange 13 at the outer end of the collet 2. The collet 2 is then inserted into the outwardly flaring conical bore portion 5 in the outer end of the chuck body 1, and the clamping nut 3 partially screwed on the boss 6 until the outer conical surface 10 of the collet 2 loosely engages the complementary surface of the bore 5 in the chuck body 1, in which position the circular aperture 17 in the front wall 16 of the nut 3, the semi-circular wall 22 or the cavity 21 in the nut 3, and the collet 2 are all in axial alignment. The cylindrical shank 29 of a tool or workpece is then inserted through the circular aperture 17 in the front wall 16 of the clamping nut 3 and into the cylindrical bore 8 in the collet 2. The clamping nut 3 ls then rotated to the limit of its movement in a direction to tightly screw it onto the boss 6, which forces the collet 2 into the bore 5 whereby the cooperating surfaces of the collet 2 and bore 5 are wedged into tight engagement with each other and the collet 2 contracted into firm gripping engagement with the shank 29 disposed within the axial bore 8 in the collet.

In order to remove the tool or workpiece shank 29 from the chuck the clamping nut 3 is rotated in the opposite direction to unscrew it from the boss 6. As the nut 3 moves outwardly on the boss 6 it moves the collet 2 along with it outwardly of the bore portion 5 in the chuck body 1, due to the constant engagement of the axially outer face 28 of the semi-circular flange 26 with the shoulder 14 of the cylindrical flange 13 on the collet 2. After the nut 3 has been partially unscrewed from the boss 6 the collet 2 will have been withdrawn outwardly in the bore 5 a slight amount, and the tapered outer wall 10 of the collet will be moved out of engagement with the correspondingly tapered wall of the bore 5, thereby permitting the collet 2 to expand to its normal size and release its grip on the shank 29 which can then be removed. The nut 3 and collet 2 can then be left in this position ready for the reception of another tool or workpiece shank, or they can be entirely removed from the chuck body 1 and disassembled.

From the foregoing it will be apparent that I have provided a very simple and efficient means for accomplishing the objects of the invention. It is to be understood that I am not limited to the specific construction shown and described herein as various modifications may be made therein within the spirit of the invention and the scope of the appended claims.

I claim:
1. A collet chuck comprising a body having a forwardly flared bore therein; a radially compressible, axially bored collet adapted for reception in said bore and having a forwardly flared outer surface complementary to the flare of said bore; a cylindrical locking flange carried by said collet at its forward end and spaced axially forward of said tapered surface by an annular groove; an annular clamp member having an axial opening at its forward end of smaller radius than the radius of said locking flange, said clamp member having an internal, recess therein for the accommodation of said locking flange, said recess being coaxial with said opening and being defined by a pair of spaced connected, semi-circular walls each formed on a radius greater than that of said locking flange; a holding flange carried by said clamp member rearwardly of said forward end thereof and projecting inwardly into said recess, said holding flange being formed on a radius greater than that of said locking flange and being eccentric to said recess, said locking flange being removably accommodated in said groove between the forward end of said clamp member and said holding flange; and means carried by said body and said clamp member for securing the latter to said body.

2. The construction set forth in claim 1 wherein said securing means comprises correspondingly threaded portions on said body and on said clamp member.

3. The construction set forth in claim 1 wherein said collet is axially slit from end to end.

4. The construction set forth in claim 1 wherein the radius of said holding flange corresponds to the radius of said recess and is offset from the axis of said recess by an amount corresponding to the radial width of said holding flange.

5. A collet chuck comprising a body having a forwardly flared bore therein; a radially compressible, axially bored collet axially slit from end to end adapted for reception in said bore and having a forwardly flared outer surface complementary to the flare of said bore; a cylindrical locking flange carried by said collet at its forward end and spaced axially forward of said tapered surface by an annular groove; an annular clamp member having an axial opening at its forward end of smaller radius than the radius of said locking flange, said clamp member having an internal, recess therein for the accommodation of said locking flange, said recess being coaxial with said opening and being defined by a pair of spaced connected, semi-circular walls each formed on a radius greater than that of said locking flange; a holding flange carried by said clamp member rearwardly of said forward end thereof and projecting inwardly into said recess, said holding flange being formed on a radius larger than that of said locking flange and being eccentric to said recess by an amount corresponding to the radial width of said holding flange, said locking flange being removably accommodated in said groove between the forward end of said clamp member and said holding flange; and correspondingly threaded portions carried by said body and said clamp member for securing the latter to said body.

References Cited

UNITED STATES PATENTS

| | | | |
|---|---|---|---|
| 1,973,942 | 9/1934 | Buhr | 279—49 |
| 2,449,887 | 9/1948 | Edel | 279—49 |
| 2,609,209 | 9/1952 | Perman | 279—49 |

ROBERT C. RIORDON, *Primary Examiner.*

R. V. PARKER, JR., *Assistant Examiner.*